Figure 2A:
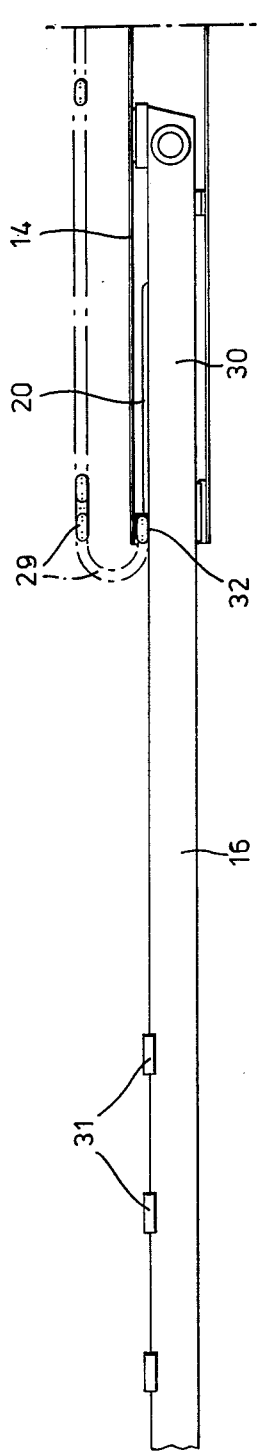

United States Patent [19]

Muse et al.

[11] Patent Number: 4,470,229
[45] Date of Patent: Sep. 11, 1984

[54] TELESCOPIC BOOMS FOR CRANES, ACCESS OR LOAD PLATFORMS OR THE LIKE

[75] Inventors: Neville Muse, Washington; Christopher Metcalf, Sunderland, both of England

[73] Assignee: Coles Cranes Limited, Sunderland, England

[21] Appl. No.: 368,255

[22] Filed: Apr. 14, 1982

[30] Foreign Application Priority Data

Apr. 14, 1981 [GB] United Kingdom ................ 8111824

[51] Int. Cl.³ .............................................. B66C 23/06
[52] U.S. Cl. ...................................... 52/118; 414/918
[58] Field of Search ................. 52/115, 118, 632, 121; 212/230, 242, 243, 251, 259, 264, 267; 414/918; 191/12 R; 187/9 E; 182/2

[56] References Cited

U.S. PATENT DOCUMENTS

| | | | |
|---|---|---|---|
| 1,926,697 | 9/1933 | Murphy | 182/2 |
| 2,791,293 | 5/1957 | Schenkelberger | 414/918 |
| 2,918,143 | 12/1959 | Shaffer | 187/9 E |
| 3,062,325 | 11/1962 | Quayle | 187/9 E |
| 3,136,385 | 6/1964 | Eitel | 182/2 |
| 3,163,880 | 1/1965 | Johnson | 182/2 |
| 3,467,217 | 9/1969 | Zwight | 182/2 |
| 3,480,109 | 11/1969 | Eital et al. | 182/2 |
| 3,757,895 | 9/1973 | Knutson | 182/2 |
| 3,845,596 | 11/1974 | Veenstra | 52/121 |
| 3,894,616 | 7/1975 | Kawanishi et al. | 414/918 |
| 3,987,870 | 10/1976 | Wojtyna | 414/918 |
| 4,004,695 | 1/1977 | Hockensmith et al. | 52/118 |
| 4,304,077 | 12/1981 | Muller | 414/918 |

FOREIGN PATENT DOCUMENTS

| | | | |
|---|---|---|---|
| 0144843 | 5/1980 | Fed. Rep. of Germany | 191/12 R |
| 1129062 | 10/1968 | United Kingdom | 414/146 |

Primary Examiner—Carl D. Friedman
Attorney, Agent, or Firm—Townsend and Townsend

[57] ABSTRACT

A telescopic boom for a crane, access or load platform or the like, having power transmission lines extending along the boom to its head. In order to avoid problems which arise with such power lines when the bottom is extended or retracted the invention proposes the use of a flexible carrier which extends between a point at the outer end of the base section and a point mid way along the extended sections of the boom between the head and the end of the base section. This enables the power lines to be protected both when the boom is extended and when it is retracted.

12 Claims, 5 Drawing Figures

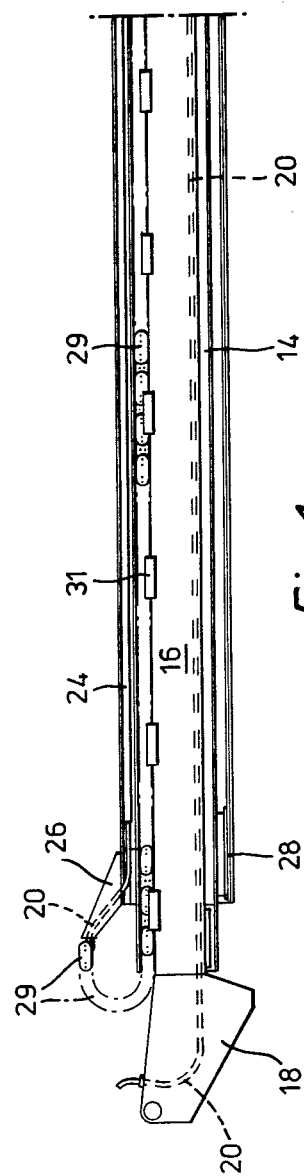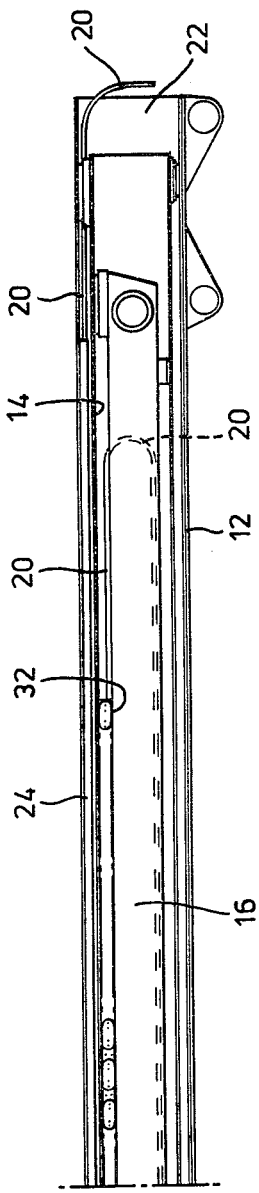

TELESCOPIC BOOMS FOR CRANES, ACCESS OR LOAD PLATFORMS OR THE LIKE

This invention relates to telescopic booms for cranes, access or load platforms or the like and in particular to power transmission along the telescopic boom.

When power (e.g. electric power, compressed air, water or welding gas) is required to be transmitted up the boom to control or to be used on a unit at the outermost end of a telescopic boom, the power transmission members e.g. cables, pipelines or the like have to extend up the telescopic boom to that outermost end. This leads to various problems when the boom is extended or retracted and the effective length of the cables or the like changes. For example loose lengths produced as the boom shortens, may be damaged.

Hitherto the power transmission members have been supported on the telescopic sections, by complicated and expensive support means. If the members are carried on the outside of the boom they are even more likely to be damaged.

The general object of the invention is therefore to obviate or mitigate this problem.

According to the invention a telescopic boom for a crane, load platform or the like, comprises at least two telescopic sections and a power transmission member extending along the telescopic sections, characterised in that the power transmission member is supported by a flexible carrier (for example that hereinafter defined) extending between a point at or adjacent the outer end of the base section and a point on a telescopic section at or adjacent the mid point of the length of the part of the telescopic section(s) which extends out from the base section when the boom is fully extended.

By the term flexible carrier is meant a conventional drag chain which is adapted or arranged to carry power transmission lines and which is flexible enough to bend at least 180° about its transverse axis but is prevented in bending about the transverse axis in the opposite sense by mechanical stops or cams thus allowing only a limited amount of sag when in position on the boom.

The arrangement or parts for a three section boom is preferably that the power transmission member(s) extend up within or without the base or outermost section and then pass through the flexible carrier which extends from the outer end of the base section, outside the mid or second section to a point adjacent the inner end of the innermost section, the transmission members then extending up within the innermost section to the head thereof. Thus the only portion of the transmission member which lies outside a movable telescopic section where it may be damaged, is protected by the carrier. When the sections are telescoped together the carrier lies between the outer surface of the innermost section and the inner surface of the second section and no portion of the transmission member is exposed.

When the multi section telescopic boom according to the invention has two sections the flexible carrier extends between a point at or adjacent the outer end of the base section and a point at or adjacent the mid point of the innermost section.

In this embodiment also the flexible carrier extends between the two points outside the telescopic boom when the boom is fully extended and extends between the two points inside the telescopic boom when the boom is fully retracted, the flexible carrier being then supported and stored on the outside surface of the innermost telescopic section.

Preferably guide means are provided to guide and place the flexible carrier in position when the boom is in the process of being retracted.

Preferably an outwardly extending bracket is provided at or adjacent the outer end of the base section, and the flexible carrier then extends from the bracket along the mid or second telescopic section at an appropriate distance spaced from the outer surface of the section when the boom is extended.

Figure 2B:
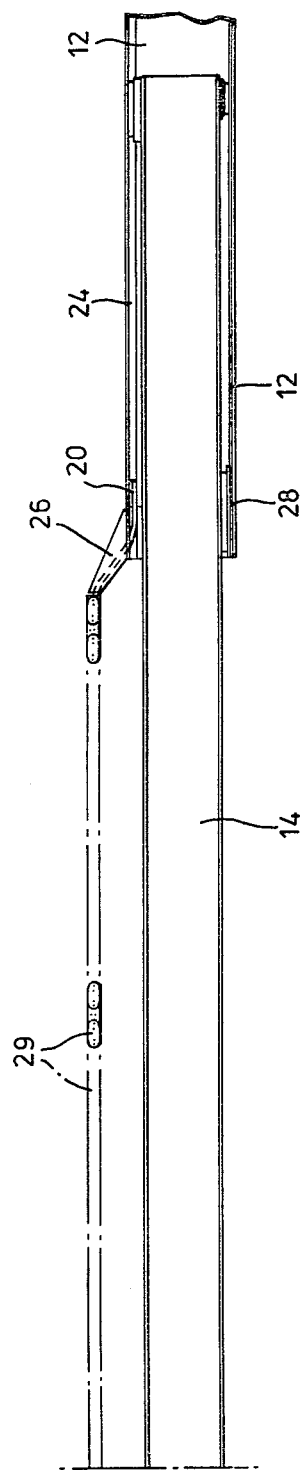
Figure 3:
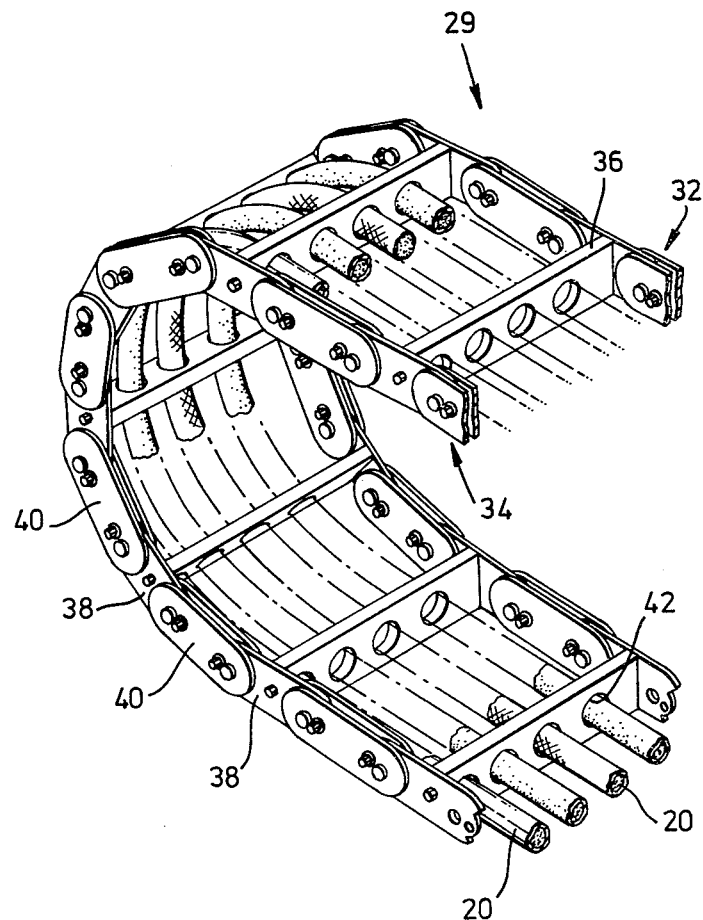

The invention will now be described, by way of example, with reference to the accompanying drawings, in which:

FIGS. 1a and 1b are cross-sectional views of one embodiment of telescopic boom in accordance with the present invention in its contracted position, FIGS. 2a and 2b are views of part of the boom of FIG. 1 but in the fully extended position, and FIG. 3 is a detail view of one embodiment of suitable flexible carrier for the boom shown in FIGS. 1 and 2.

The telescopic boom shown in the drawings comprises three telescopic sections namely, a base section 12, a mid or second movable section 14, and an innermost movable section 16. The base section 12 is in use securely fixed to a superstructure e.g. a vehicle (not shown) and the section 16 is shown with a boom head 18 attached at its outer end.

Power transmission members in the form of cables and/or service pipes 20 extend from the superstructure to the boom head 18. The cables or pipes 20 run from the superstructure into a casing 24 fixed to the inner or outer walls of the base section 12. This casing 24 protects the cables or pipes 20 from the mid or second section 14 when the boom is retracted and/or from external damage.

The cables or pipes 20 then pass to a bracket 26 mounted on the outer end 28 of the base section 12. To this bracket 26, one end of a flexible carrier in the form of a drag chain 29 is securely fixed, the other end of the drag chain 29 being securely fixed to the lower portion 30 of the innermost section 16 at the point 32. The drag chain thus extends between the bracket 26 and the point 32, the chain being of the appropriate fixed length such that it can only sag very slightly towards the section 14 when the boom is extended.

Accordingly the bracket 26 holds the drag chain 29 at a distance from the outside surface of the section 14 when the boom is fully extended, and because the drag chain can only sag slightly, it does not come into contact with the outer surface of the section 14.

The cables or pipes 20 pass through this drag chain 29 (see FIG. 3) and thus are safely transferred to the point 32 without being damaged by the moving telescopic sections. The cables or pipes 20 are finally passed from the point 32 up through the interior of the movable section 16 to the boom head 18. Accordingly the cables or pipes 20 are protected all the way up the boom 10, firstly by the casing 24, secondly by the drag chain 29 and finally by being passed up the interior of the section 16.

FIGS. 1 and 2 show the boom 10 in the fully retracted and extended positions respectively, and it will be seen that in the fully extended position the point 32 is at the mid-point of the length of the telescopic sections 14 and 16 extending out from the outer end 28 of the base section 12. This is because when the boom is retracted, the drag chain 29 is gradually bent through 180° about its transverse axis to be laid down on the outer surface of the innermost section 16. Therefore for any length of the section 14 retracted, a corresponding length of drag chain 29 will be laid down on the section 16, and if the section 14 is fully retracted then the full length of drag chain 29 is laid down. Thus assuming that the length of sections 14 and 16 are substantially equal, which is conventional, the point 32 will be at the inner end of the innermost section 16 and at the mid-point of that length of sections 14 and 16 which extend out from the outer end 28 of the base section 12 when the boom is fully extended.

To assist in the laying down of the chain 29 when the guide members 31 in the form of U-shaped trays and/or funnel shaped guide attached to the front of section 14 or the other end 28 of the base section 12 in the case of a two section boom, are provided and place in position the drag chain on the outer surface of the section. The drag chain 29 is thus safely stored between the outside surface of the section 16 and the inside surface of the section 16 when the boom is fully retracted.

When a telescopic boom consists of only two sections the same principle applies and the drag chain is then attached approximately to the mid point of the second section, which corresponds exactly to the mid point of the length extending from the outer end of the base section to the outer end of the second section.

Considering the drag chain 29 in more detail (see FIG. 3), the chain which is of conventional construction, comprises two sides 32 and 34 parallel to each other, and a number of perpendicular members 36 extending from the one side to the other. The two sides 32 and 34 consist of alternating single links 38 and double links 40 pivoted at each end to each other in such a way that the sides of the drag chain 29 allow bending of the chain about an angle of 180° in one direction but prevented from bending in the opposite mode about the transverse axis. The members 36 are shown with a number of holes 42 through which are passed an equal number of service pipes or cables 20, the members 36 being securely fixed to the drag chain at each alternating single link 38.

Accordingly, provided the two ends of the chain 29 are securely fixed and extending between those two ends, the chain 29 can extend from the base section to the innermost section without sagging onto the surface of the section 14 and thus avoid possible damage to the cables or pipes 20.

The cables or pipes 20 can be adapted to transfer any type of power e.g. electric power, compressed air, water, welding gas or hydraulic fluid. The appropriate unit, for example an aerial platform or fire fighting unit, is securely attached to the boom head 18 through which the cables or pipes 20 are then led for use.

We claim:

1. A telescopic boom, of the type for use in a crane, a load platform or the like, comprising:
   a telescopic section and a base section telescopically coupled to one another;
   a power transmission member extending along the telescopic section;
   the power transmission member being supported by a flexible carrier extending between a point proximate and outside an outer end of the base section and a point on the telescopic section, which point is located about a mid point of the length of the part of the telescopic sections which extends out from the base section when the boom is fully extended.

2. A telescopic boom as claimed in claim 1 wherein the telescopic section includes an intermediate section and an innermost section wherein the power transmission member extends up the base section, passes through and along the flexible carrier, which extends from the outer end of the base section and outside the intermediate section to a point adjacent an inner end of the innermost section, the transmission member then extending within the innermost section to an outer, head end thereof.

3. A telescopic boom as claimed in claim 1 wherein the telescopic section includes an innermost section, the flexible carrier extending to about a mid point of the innermost section, the power transmission member then extending within the innermost section to an outer, head end thereof.

4. A telescopic boom as claimed in claim 1 wherein guide means are provided on the telescoping section to guide and hold the flexible carrier and the power transmission member when the boom is being telescopically retracted.

5. A telescopic boom as claimed in claim 1 wherein an outwardly extending bracket is provided at the outer end of the base section, the flexible carrier extending from that bracket along the telescopic section at an appropriate distance spaced from the outer surface of the telescopic section when the boom is extended.

6. A telescopic boom as claimed in claim 1 wherein the flexible carrier comprises a drag chain which is flexible configured to bend at least 180° about a transverse axis but is prevented from bending in the opposite sense.

7. Telescopic boom apparatus comprising:
   a telescopic boom including a base section and at least one telescopic section, said base section having outer and inner ends;
   a flexible power transmission member;
   a drag chain having first and second ends and configured to protectively carry the powr transmission member therealong;
   the first drag chain end mounted to an upper surface of the base section at the outer end thereof to extend in a forward direction past the outer end;
   the second drag chain end mounted to an upper surface of the telescopic section at a point along the telescopic section which is in a rearward direction of the base section outer end when the telescopic section is retracted;
   the drag chain arranged and adopted to flex in a single direction only so as said telescopic section moves relative to the base section any drag chain portion extending forward from the first drag chain end is kept from sagging while any drag chain portion extending forward from the second drag chain end rests upon the telescopic section upper surface.

8. The apparatus of claim 7 further comprising a guide member mounted to the upper surface of the telescopic section adapted to position said drag chain when said drag chain is resting on said telescopic section upper surface.

9. The apparatus of claim 7 further comprising a protective casing mounted to the base section for housing the power transmission member between the base section outer and inner ends.

10. The guiding apparatus of claim 7 wherein the telescopic section is arranged and adapted to guide the power transmission member within the telescopic section from said point along the telescopic section to a head end of the telescopic section.

11. The apparatus of claim 7 wherein the telescopic boom includes first and second telescopic boom sections.

12. Telescopic boom apparatus comprising:
a telescopic boom including a base section and at least one telescopic section, said boom having outer and inner ends;
a flexible power transmission member;
a drag chain having first and second ends and configured to protectively carry the powr transmission member therealong;
the first drag chain end mounted to an upper surface of the base section at the outer end thereof to extend in a forward direction past the outer end;
the second drag chain end mounted to an upper surface of the telescopic section at a point along the telescopic section which is in a rearward direction of the base section outer end when the telescopic section is retracted;
the drag chain arranged and adopted to flex in a single direction only so as said telescopic section moves relative to the base section any drag chain portion extending forward from the first drag chain end is kept from sagging while any drag chain portion extending forward from the second drag chain end rests upon the telescopic section upper surface;
guide members mounted to the upper surface of the telescopic section adapted to position said drag chain when said drag chain is resting on said telescopic section upper surface;
a protective casing mounted to the base section for housing the power transmission member between the base section outer end and the base section inner end; and
the telescopic section being arranged and adapted to guide the power transmission member within the telescopic section from said point along the telescopic section to a head end of the telescopic section.

* * * * *